INVENTOR
ROBERT W. COPE
BY William G. Christoforo
ATTORNEY

INVENTOR
ROBERT W. COPE

BY William G. Christoforo
ATTORNEY

INVENTOR
ROBERT W. COPE
BY William G. Christoforo
ATTORNEY

United States Patent Office 3,517,216
Patented June 23, 1970

3,517,216
MEANS FOR GENERATING A VIDEO CONSTANT FALSE ALARM RATE SIGNAL AT VIDEO FREQUENCIES

Robert W. Cope, Sparks, Md., assignor to The Bendix Corporation, a corporation of Delaware Filed Jan. 4, 1968, Ser. No. 695,775
Int. Cl. H03k *5/08*
U.S. Cl. 307—237 12 Claims

ABSTRACT OF THE DISCLOSURE

A means for generating a constant false alarm rate at video frequencies utilizing a plurality of serially connected video amplifiers for amplifying a video input signal and a plurality of full wave detectors with each full wave detector sampling a different interstage junction of the serially connected video amplifiers. The output of the full wave detectors are combined in a unilateral video adder. The adder output is capacitively coupled to a terminal upon which the constant false alarm rate signal appears.

BACKGROUND OF THE INVENTION

Constant false alarm rate (CFAR) means that the rate at which a signal level exceeds a given threshold, due to erroneous or undesirable signal contributions, remains constant. These undesirable signal contributions are typically called noise. CFAR circuitry assures that the number of times per second that the signal level exceeds a given threshold due to noise or undesirable signal contributions remains constant, even if the noise or undesirable signal level varies. Thus, it may be said that a system which displays CFAR characteristics has a constant noise output regardless of the input noise level.

CFAR characteristics are needed in systems which require a constant noise background level and protection against a varying noise background, especially when a decision as to the presence or absence of a signal pulse is to be made, either by human judgment or some type of threshold circuitry. CFAR has proved most useful in pulse applications such as radar, where the concern is with the noise level and the absence of the signal is compared to the composite of signal plus noise.

Generally, techniques which provide CFAR signal processing have been limited to:

Wide bandwidth limiter followed by narrow bandwidth filter,
Conventional logarithmic receiver,
Automatic gain control (AGC).

The wide bandwidth limited followed by a narrow bandwidth filter uses the principle of normalizing the power level of all signals, after which the signals are processed through a narrow band filter, whose bandwidth is optimized to the desired signal. The noise or undesired signals are assumed to be of wide bandwidth since their major contribution arises from such noise or undesired signals which originate in the first amplifiers or externally to the receiver. When processed by the narrow band filter, the noise is suppressed by an amount equal to the ratio of the wide and narrow bandwidths of the limiter and filter respectively. The wide band limiter is designed to hard limit on the lowest level of expected noise, thus additional noise is noticeable only insofar as it masks the signal. The effect of additional noise, therefore, is to lower the signal without itself rising. In this way, the desired signals are effectively enhanced by the bandwidth ratio.

The logarithmic receiver uses an entirely different concept to provide CFAR characteristics and differs from the first mentioned technique in that it performs CFAR processing on narrow band noise. The noise bandwidth in this case is considered narrow in that it coincides with the desired signal bandwidth. Briefly, the logarithmic receiver consists of a number of cascaded linear I.F. amplifiers with a detector on the output of each. Since CFAR processing in this instance is being performed at radio frequencies, the noise is monopolar so that the detector need only be a half-wave detector. The detector outputs are added together and their sum is A.C. coupled, typically through a capacitor, to an output terminal.

Of course, the transfer function of this device (I.F. input volts to video output volts) is logarithmic. When considering radio frequency noise in conjunction with A.M. detectors, the noise may be thought of as though it were a C.W. carrier that has been amplitude modulated by a random function, with the modulator set for a fixed percentage modulation. When a radio frequency signal of fixed percentage A.M. modulation, whether the modulation be random or repetitious, is amplitude detected and then applied to a device with a logarithmic transfer function, the A.C. portion of the detected output will remain constant in amplitude regardless of the input signal strength. However, the D.C. component in the output is directly proportional to the logarithmic of the signal strength. Additionally, the D.C. portion of the output signal is produced by contributions from all the detecting stages, the limiting as well as the non-limiting, whereas the A.C. portion is produced by contributions from only the non-limiting detecting stages. The early stages, however, which contain signals too small for dētection, contribute negligibly to the video output, while the final stages which may be hard limited also contribute nothing to the video output. The key, thus, to the CFAR performance is that the stages which are contributing the A.C. portion of the output always contribute the same amount of total signal. To obtain CFAR performance, the output signal is A.C. coupled to eliminate the D.C. portion of the detected signal.

The third approach to CFAR processing, namely, an AGC system, senses the average signal amplitude of the output of an amplifier and develops a voltage which is fed back to control the gain of the amplifier such that the average signal level of the output remains constant. The major problem with the AGC technique is that the integration time required to determine the average signal level produces a time delay in adjusting the gain. This is an unsatisfactory way to obtain CFAR characteristics, because sudden increases in noise level cause temporary increases in output signal level.

It can be seen that in the previous CFAR systems, except AG, the CFAR processing must be performed at radio or intermediate frequencies (prior to detection). The AGC techniques suffers from an inherent slowness of operation. There are, however, two specific examples in radar alone where it is essential that CFAR processing be at video rather than at intermediate frequencies. First, when CFAR capability is desired in an MTI system, the MTI processing is most conveniently and almost invariably done first and includes detection, so that the CFAR processing must be at video frequencies. The second example is the combination of CFAR processing with differentiated linearly detected video. This is a method of distinguishing between slightly separated or overlapping targets wherein the differentiation process discards any D.C. component in the A.M. detected video such as may be prevalent in ground clutter. However, it is necessary that the detector process be linear so that large C.W. components do not suppress small signals occurring at the same time. This one requirement precludes the use of a conventional logarithmic receiver.

SUMMARY OF THE INVENTION

Accordingly, a means for performing CFAR processing on narrow band bipolar video noise has been devised using certain concepts similar to those of the logarithmic receiver combined with other, novel, concepts to produce a practical CFAR system. Briefly, the new invention includes a plurality of cascaded video amplifiers whose individual outputs are full-wave detected and combined in an adder. Those stages which are limiting produce only D.C. in the output, the stages containing large signals but which are not limiting produce both A.C. and D.C., while the earlier stages which contain small signal levels contribute nothing to the output. Its major differences are that the cascaded amplifiers handle video and not intermediate frequencies, and that the detectors are full wave and not simple peak half wave averaging type detectors. It should be remembered that a hard limited half wave detector having an intermediate frequency input produces a D.C. output. It should addiitonally be obvious that a hard limited half wave detector having a video input, however, will have as output a series of noise pulses which include A.C. components. The full wave detection of noise, however, can be looked upon as signal unipolarization, such as in processing conventional MTI video. In the amplifier stages where the noise is hard limiting, the composition of the noise is square waves of varying frequency. When these square waves are full wave detected, the result is a D.C. voltage. This particular phenomenon, that is, when a signal consisting of constant amplitude square waves is full wave detected, the resultant is a D.C. voltage only, is one key to the operation of this invention.

Since all signal processing is being done at the video level, a practical circuit employing the techniques of this invention must include a unilateral output adding network to prevent undesirable feedback between the CFAR output and the video input to the cascaded video amplifiers. This elimination of unesirable feedback provides a second key to the successful and practical embodiment of this invention.

DESCRIPTION OF THE PREFERRED EMBODIMENT

Figure 1:
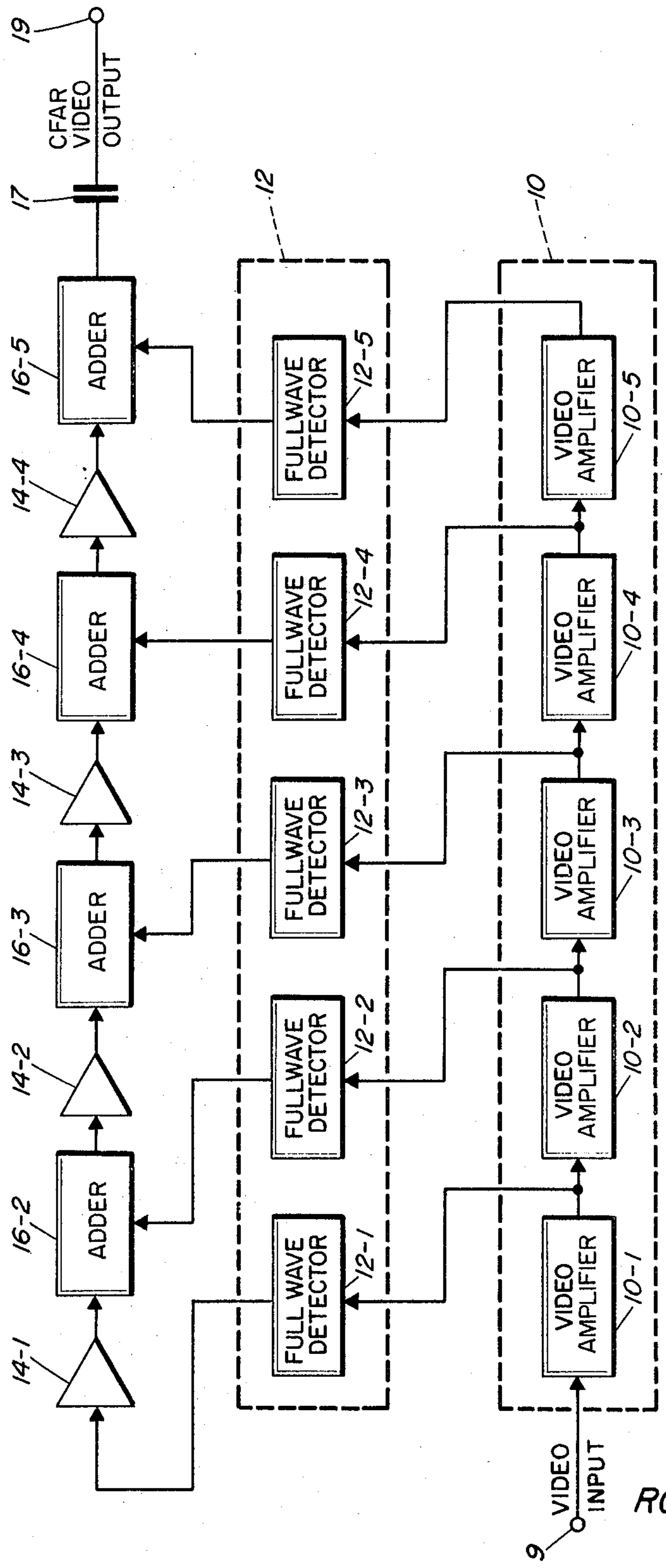
FIG. 1 is a block diagram showing the principles of the invention.

Referring to FIG. 1, a video signal containing noise is applied to terminal 9, the input terminal of the cascaded video amplifiers generally designated at 10. Although this diagram shows five stages of video amplification, it will become apparent that any practical number of stages will be satisfactory for CFAR operation. The output of each video amplifier is supplied to the input of the succeeding amplifier with a full wave detector generally designated at 12, sampling such output. The outputs of all detectors are combined in an adder comprised of the adding sections generally designated as 16 and unilateral video amplifiers generally designated as 14. The unilateral video amplifiers 14 allow passage of video signals only in the forward directions in order to prevent undesirable feedback between stages. The final adder stage 16–5 supplies its output, which is the amplified video output including a constant noise level or CFAR, through capacitor 17 to CFAR video output terminal 19.

Assuming a comparatively weak input signal is applied to terminal 9, the amplified outputs of video amplifiers 10–1, 10–2 and 10–3, for example, may be too weak to produce outputs from detctors 12–1, 12–2 and 12–3, respectively. The output of video amplifier 10–4, however, may be large enough, after four stages of amplification, to produce an output at full wave detector 12–4, thereby providing an input to the adder. In this case, of course, video amplifier 10–5 output, when detected by detector 12–5 contributes a much larger adder input. These adder inputs will contain both video and D.C. components, with the D.C. components being removed by capacitor 17 defore the CFAR video output appears on terminal 19. If the noise contained in the video signal applied to terminal 9 should now increase the output of each video amplifier stage will also increase, with the result that video amplifier 10–5 will now be hard limited so that detector 12–5 will generate only a D.C. output. Additionally, the output of video amplifier 10–3 will now be large enough for detection in detector 12–3, so that this detector now makes a contribution to the adder. Thus, in this case, full wave detectors 12–3 and 12–4 make both A.C. and D.C. contributions to the unilateral adder while full wave detector 12–5 makes only a D.C. contribution to the adder. Since the dynamic range of each stage is identical, the A.C. contribution to the adder remains constant, while the D.C. contribution increases as the noise level of the video input signal increases. The CFAR output of the adder is thus constant after the D.C. level is removed by capacitor 17. In like manner, as the noise content of the video input on terminal 9 increases still further, the higher dash numbered stages become limiting, thus contributing only a D.C. component to the adder, while the A.C. contribution to the adder is made by successively lower dash numbered stages. It should now be obvious that to increase the CFAR dynamic range of this system, one would merely increase the number of cascaded stages.

Figure 2A:
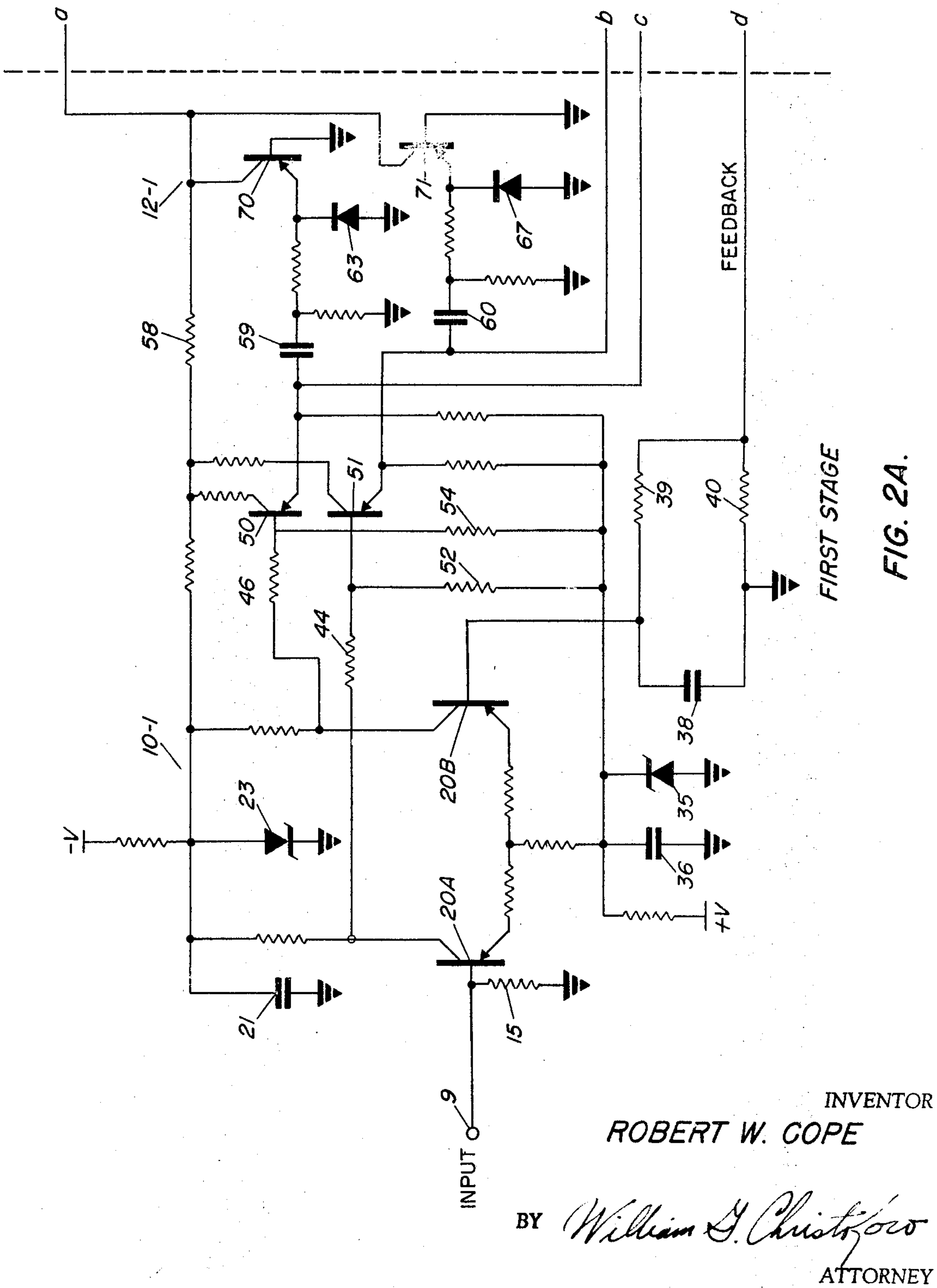
FIGS. 2A and 2B are schematic diagrams showing a practical circuit emloying the principles of this invention.
Figure 2B:
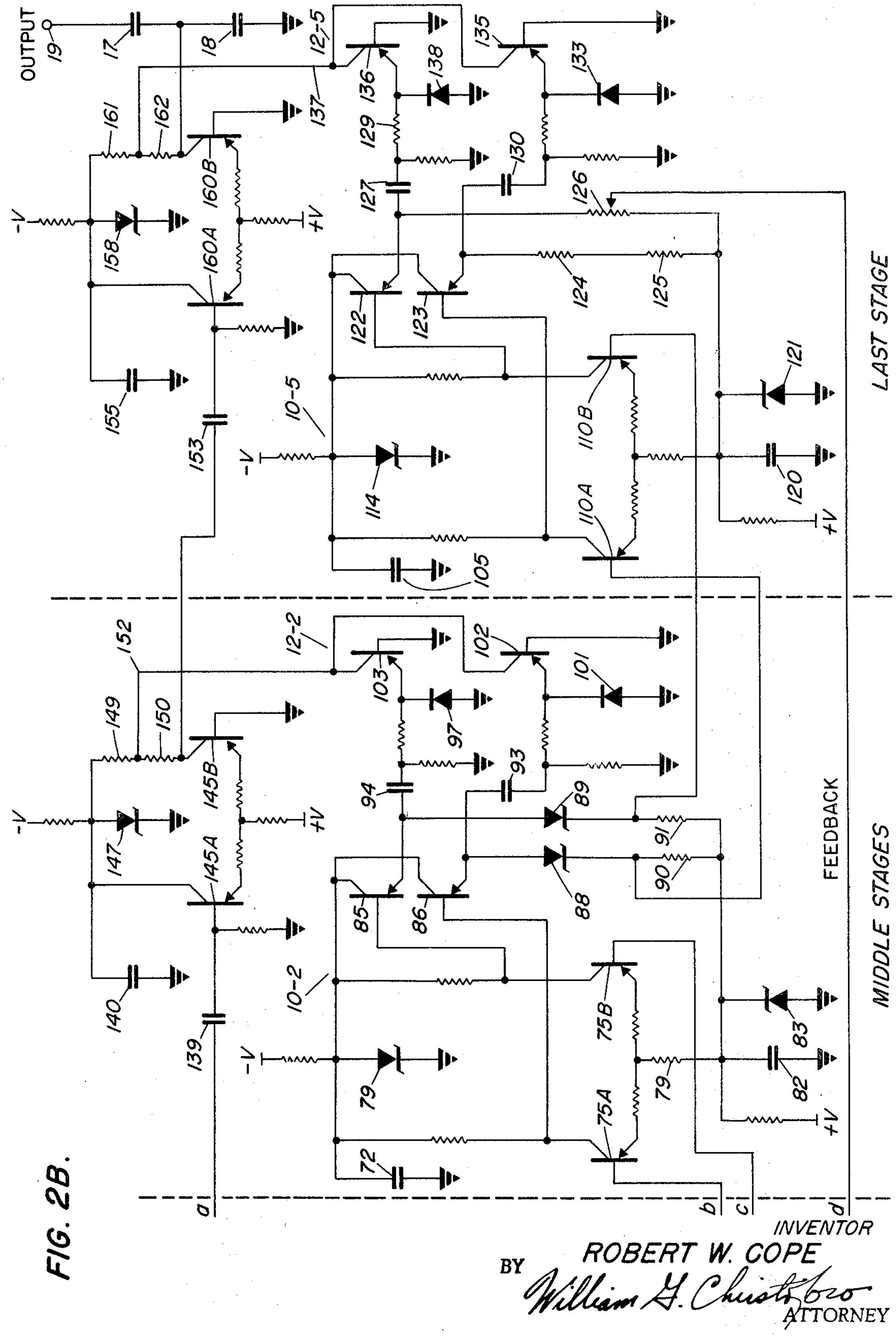

Referring now to FIGS. 2A and 2B, a video signal containing noise on input terminal 9 is coupled to video amplifier 10–1, biasing being supplied by resistor 15. The video amplifier is seen to be comprised of differentially connected transistors 20A and 20B, with the video input signal applied to the base of transistor 20A, while a D.C. stabilizing feedback signal is applied to the base of 20B. The amplifier dual output is taken from the collectors of the amplifier transistors through the voltage dividers comprised of resistors 46 and 54 and resistors 44 and 52 and applied to the bases of emitter followers 50 and 51 respectively. The emitter follower outputs are applied to differentially connected amplifier 10–2, namely, the bases of amplifier transistors 75A and 75B. The emitter follower output is also capacitively coupled through capacitors 59 and 60 to the full wave detector 12–1 which includes diodes 63 and 67 and transistors 70 and 71. The full wave detector, it will be noted, comprises a pair of half wave averaging detectors, one of which includes diode 63 and transistor 70 and the other one of which includes diode 67 and transistor 71. Each half wave detector is connected to an emitter follower so as to receive one half the video amplifier output while the half wave detector outputs are joined at a common junction to effect full wave detection. The detector output is then coupled via capacitor 139 to the differential amplifier comprised of transistors 145A and 145B, with the amplified output appearing across resistors 149 and 150.

The middle video amplifier stage, namely, amplifier 10–2, emitter followers 85 and 86, and full wave detector 12–2, is generally identical to the first stage, except that the second and succeeding stages have a dual input, whereas the first stage amplifier has a signal ended input. The gain determinative resistors in the various stages must thus be chosen to make the gain of the stages the same.

Although the schematic, for simplicity, shows a CFAR system having only three stages, it should be understood that in systems having a larger number of stages all stages except the first and last stages are generally identical to the second stage. An exception to this might be in the use of Zener diodes 88 and 89 which are used in the middle stages to hold the D.C. voltage levels through the stages at the proper level. It will be remembered that in this embodiment, the D.C. voltage level at the junction between the first and second stage was dropped to the proper level by a voltage divider. This is done to prevent the introduction of noise characteristic of Zener diodies into the first stage output where it can be amplified to objectionable levels by latter stages. For this reason it might be desirable in a cascaded amplifier having many stages to employ voltage dividers for maintaining the voltage at the proper level in a larger number of early stages before using Zener diodes. Of course, except for their introduction of noise, Zener diodes are preferred for stabilizing the D.C. voltage levels since they have a minimum effect on A.C. voltage levels, whereas the resistive voltage dividers cause attenuation of the A.C. signal component. The detected output of the second stage, that is, the output appearing on line 152, is added to the amplified detected output from the first stage in the adder comprised of resistors 149 and 150. Video amplifier 145A, 145B, being unilateral prevents feedback of the second stage detected signal into the first stage.

The last stage which is identical to the middle stage except in some minor areas, to be later explained, receives the second stage emitter follower output on the bases of its differentially connected transistors 110A and 110B. The amplified video signal, as before, is applied to full wave detector 12–5 through emitter followers 122 and 123 with the detected output appearing on line 137. The second stage adder output is coupled through capacitor 153 to the base of transistor 160A, which, together with transistor 160B comprise a differential amplifier with the amplified output appearing across the adder comprised of resistors 161 and 162, there to be combined with the last stage detected output, with the adder output being capacitively coupled to output terminal 19. As has been previously mentioned, capacitor 17 removes the undesired D.C. signal component.

The last stage differs from the middle stages in the use of potentiometer 126 which allows a feedback signal extracted from the last stage to be applied as one input to the differentially connected first stage amplifier. The correct feedback balance is initially set by the adjustment of the potentiometer 126 in the feedback circuit comprised of capacitor 38 and resistors 39 and 40. Additionally, as previously mentioned, the middle stages include voltage dropping Zener diodes 88 and 89 together with resistors 90 and 91 to hold the D.C. voltage levels through the cascaded amplifier at the proper level.

The Zener diodes 23, 35, 79, 83, 114, 121, 147 and 158 allow power supply voltages to be stabilized while preserving interstage isolation. Additionally, capacitors 21, 36, 72, 82, 105, 120, 140 and 155 remove undesirable A.C. components from the varous stages of the system. Capacitor 18 defines the output bandwidth and eliminates spikes inherent in the full wave detection process.

Although I have described only one embodiment of my invention, it should be obvious to one skilled in the art that similar systems can be assembled using the principles of this invention, therefore, I do not wish to limit my inveniton to the specific form shown and accordingly hereby claim as my invention the subject matter including modifications and alterations thereof encompassed by the true scope and spirit of the appended claims.

The invention claimed is:

1. Means for generating a constant false alarm rate signal at video frequency in response to an input video signal containing noise-like signal components comprising:

a plurality of serially connected video amplifier stages for amplifying said input video signal, each said amplifier stage having an essentially identical dynamic range;

a plurality of full-wave detectors for sampling the outputs of each of said video amplifier stage; said serially connected video amplifier stages becoming increasingly limited whereby the D.C. component of said sampled outputs increases and the A.C. component remains essentially constant as the magnitude of said input video signal and noise-like components increase; and, an adder for combining said sampled outputs, the output of said adder comprising said constant false alarm rate signal.

2. Means for generating a constant false alarm rate signal as recited in claim 1 wherein said adder output is capacitively coupled to an output terminal to remove D.C. components from said generated constant false alarm rate signal.

3. Means for generating a constant false alarm rate signal as recited in claim 2 wherein said adder includes at least one video amplifier for equalizing said sampled output contributions to said adder.

4. Means for generating a constant false alarm rate signal as recited in claim 2 wherein said adder is unilateral in that signals may pass only in one direction therethrough.

5. Means for generating a constant false alarm rate signal as recited in claim 2 wherein said adder comprises a plurality of serially connected adder elements for combining said sampled outputs, each said element combining the sampled output of a single said video amplifier stage with the combined sampled outputs of all stages previous to said sampled output of said single video amplifier stage.

6. Means for generating a constant false alarm rate signal as recited in claim 5 wherein each said adder element includes an adder element video amplifier for amplifying said combined sampled outputs of all previous said video amplifier stages before said combined sampled outputs are combined with said single sampled output.

7. Means for generating a constant false alarm rate signal as recited in claim 6 wherein the power sources of each said amplifier stage and each said adder element amplifier are isolated from one another to prevent interaction between said amplifiers.

8. Means for generating a constant false alarm rate signal as recited in claim 7 wherein each said amplifier includes means for closely regulating its supply voltage.

9. Means for generating a constant false alarm rate signal as recited in claim 1 wherein said plurality of serially connected video amplifier stages consists of at least a first and a second stage amplifier, said first stage amplifier comprising:

a first pair of differentially connected transistors, said input video signal being applied as input to one of said transistors and feedback from a subsequent amplifier stage being applied as input to the other of said transistors, with amplified output being taken from each of said transistors; and, a first pair of emitter followers, each receiving as input, the output from one of said first pair of transistors; said second stage amplifier comprising:

a second pair of differentially connected transistors, the output of one of said first pair of emitter followers being applied as input to one of said second pair of transistors and the output of the other of said first pair of emitter followers being applied as input to the other of said second pair of transistors; and, a second pair of emitter followers, each receiving as an input the output from one of said second pair of transistors; and additionally wherein said plurality of full-wave detectors includes one full-wave detector for each of said video amplifier stages, each said full-wave detector comprising a pair of half-wave detectors having as inputs the outputs of its associated emitted followers, the outputs of said half-wave detector being made common to effect full-wave detection, the output of each said full-wave detector being the sampled output of its associated amplifier stage.

10. Means for generating a constant false alarm rate signal as recited in claim 9 wherein said adder comprises a plurality of serially connected adder elements for combining the outputs of said full-wave detectors, the first of said adder elements combining a first signal comprised of the sampled output of said first video stage with a second signal comprised of the sampled output of said second video stage, subsequent adder elements combining a second signal comprised of the sampled output of said adder element's associated video stage with a first signal comprised of the sampled outputs of all previous video stages.

11. Means for generating a constant false alarm rate signal as recited in claim 10 wherein each said adder element includes a differentially connected transistor pair for amplifying said first signals.

12. Means for generating a constant false alarm rate signal as recited in claim 11 with additionally capacitive means for removing undesired D.C. components from said generated constant false alarm rate signal.

References Cited

UNITED STATES PATENTS 3,199,042 8/1965 Baust -------------- 330—124

JOHN S. HEYMAN, Primary Examiner

S. D. MILLER, Assistant Examiner

U.S. Cl. X.R.

307—235; 328—151, 162, 165; 330—24, 26, 30, 124